No. 74,069. PATENTED FEB. 4, 1868.
T. A. & A. F. FISHER.
TUNNEL EXCAVATOR.
2 SHEETS—SHEET 1.
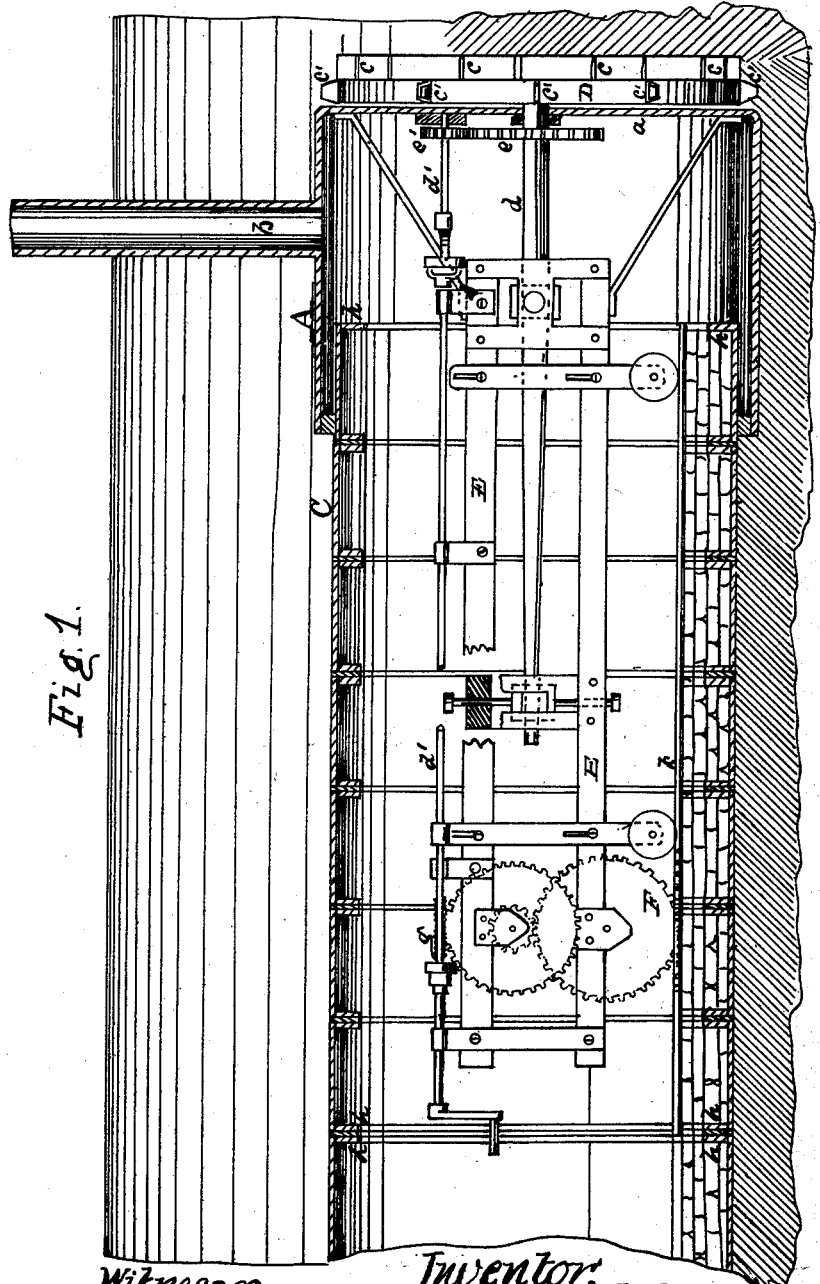

No. 74,069.
T. A. & A. F. FISHER.
TUNNEL EXCAVATOR.
PATENTED FEB. 4, 1868.
2 SHEETS—SHEET 2.
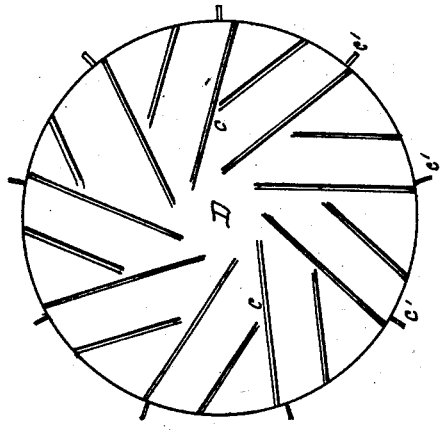
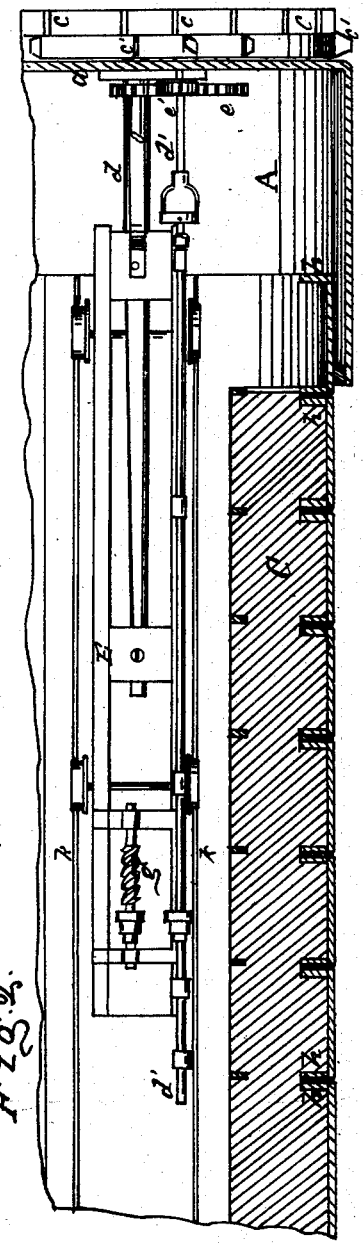
Witnesses.
Thos Fuschi
J. A. Service
Inventor.
T. A. & A. F. Fisher
Per Munn & Co
Attorneys.

United States Patent Office.

THEODORE A. FISHER AND ANSON F. FISHER, OF BEARDSTOWN, ILLINOIS.

*Letters Patent No. 74,069, dated February 4, 1868.*

---

IMPROVED TUNNEL-EXCAVATOR.

---

The Schedule referred to in these Letters Patent and making part of the same.

---

TO ALL WHOM IT MAY CONCERN:

Be it known that we, THEODORE A. FISHER and ANSON F. FISHER, of Beardstown, in the county of Cass, and State of Illinois, have invented a new and useful Improvement in Excavating and Constructing Tunnels under water; and we do hereby declare that the following is a full, clear, and exact description thereof, which will enable others skilled in the art to make and use the same, reference being had to the accompanying drawings, forming part of this specification, in which—

Figure 1 is a central longitudinal vertical section of our improved apparatus for boring and constructing tunnels under rivers, lakes, and other large bodies of water, to be used for railroads and other purposes.

Figure 2, a partial top view of the same, in horizontal longitudinal section.

Similar letters of reference indicate like parts.

This invention relates to a novel and useful method of constructing tunnels under water, and consists of an apparatus for boring or excavating the earth in the bottom of rivers, lakes, and other large bodies of water where the quantity is too great to be kept clear of the work of excavation by the ordinary means of pumping and drainage, which boring-apparatus is so arranged, in connection with a cast-iron sliding coffer, which follows up the work of excavation, that the tunnel of cast-iron plates can be joined in sections as the operation proceeds, within a chamber in the sliding coffer behind the excavator, from which chamber the water is effectually excluded, as hereinafter more particularly described.

The work of tunnelling is begun and proceeded with, in the ordinary mode of excavation, from the shore, until the quantity of water above cannot be excluded by pumping or other common devices, when our improved excavating-apparatus is applied.

In the drawing, A represents a tubular coffer, built of heavy wrought or cast-iron plates, bolted together in sections, and, for ordinary purposes of tunnels, designed for railroads or common roads, will be about twenty-two feet diameter, and twelve feet long. The front end of this tube is closed with a head, $a$, and the rear end fits over the cast-iron tubing C, with India-rubber or other suitable packing between them, to make the connection water-tight. The coffer A is provided with a spout, $b$, rising high enough to have the upper end above the water, for the purpose of ventilation. A dredging or excavating-apparatus is attached in front of the coffer, consisting of a strong wrought-iron disk, D, provided on its face with steel or other hard-metal knives or scrapers, $c\ c$, arranged askew, in such manner as to be effective, when turned in one direction, for cutting away or scraping the earth in front of them; and on the periphery of the disk D are also knives $c'$, so set as to cut away the earth far enough at the sides to the coffer A. The disk D is affixed on a shaft, $d$, that passes through the centre of the head $a$, fitting it with a water-tight joint, which shaft carries, inside of the coffer A, a spur-wheel, $e$, that gears into a pinion, $e'$, placed on a driving-shaft, $d'$, that takes motion from a portable engine, which follows up the work within the tunnel. A long car, E, supports the shafts $d\ d'$, and runs on rails $k\ k$, to follow up the work when the excavating-machinery is in operation, which forward movement is effected by means of a cog-wheel, F, working in a movable rack between the rails, and operated by a worm, $a$. and suitable connecting-gear.

The operation is as follows: As the excavating-disk D does its work, the coffer A follows, and leaves the tunnel-tubing C, which has been already constructed, as previously described, in the rear, thus forming a chamber in advance of the tubing, large enough to allow another section to be added to it, by bolting the flanges $h\ h$ together, with packing between them. When another section of the tubing has been completed, the operation of excavation is again repeated until the tunnel is finished under the water.

Having thus described our invention, we claim as new, and desire to secure by Letters Patent—

The sliding coffer A, the excavating-disk D, and the supporting-car E, combined with the cast-iron tubing C, united in sections within the coffer, constructed and operating substantially as and for the purpose herein described.

<div style="text-align: right;">
A. F. FISHER,<br>
T. A. FISHER.
</div>

Witnesses:
   JOHN DAVIS,
   JAS. DAVIS.